(12) United States Patent
Zhong et al.

(10) Patent No.: US 11,315,318 B2
(45) Date of Patent: Apr. 26, 2022

(54) METHOD FOR CONSTRUCTING GRID MAP BY USING BINOCULAR STEREO CAMERA

(71) Applicant: DALIAN UNIVERSITY OF TECHNOLOGY, Liaoning (CN)

(72) Inventors: Wei Zhong, Liaoning (CN); Shenglun Chen, Liaoning (CN); Haojie Li, Liaoning (CN); Zhihui Wang, Liaoning (CN); Risheng Liu, Liaoning (CN); Xin Fan, Liaoning (CN); Zhongxuan Luo, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 17/278,583

(22) PCT Filed: Mar. 5, 2020

(86) PCT No.: PCT/CN2020/077949
§ 371 (c)(1),
(2) Date: Mar. 22, 2021

(87) PCT Pub. No.: WO2021/098079
PCT Pub. Date: May 27, 2021

(65) Prior Publication Data
US 2022/0044474 A1     Feb. 10, 2022

(30) Foreign Application Priority Data
Nov. 21, 2019   (CN) .......................... 201911145364.8

(51) Int. Cl.
*G06T 17/05*     (2011.01)
*H04N 13/239*    (2018.01)

(52) U.S. Cl.
CPC ............ *G06T 17/05* (2013.01); *H04N 13/239* (2018.05)

(58) Field of Classification Search
None
See application file for complete search history.

(56) References Cited

U.S. PATENT DOCUMENTS 9,691,151 B1 * 6/2017 Anderson-Sprecher .....................
  G06T 7/251
2015/0379766 A1 * 12/2015 Newman .............. H04N 5/2253
  356/5.01
(Continued)

FOREIGN PATENT DOCUMENTS

CN      105469405 A      4/2016
CN      105806344 A      7/2016
(Continued)

*Primary Examiner* — Kent W Chang
*Assistant Examiner* — Jonathan M Cofino
(74) *Attorney, Agent, or Firm* — Muncy, Geissler, Olds & Lowe, P.C.

(57) ABSTRACT

The present invention discloses a method for constructing a grid map by using a binocular stereo camera. A high-performance computing platform is constructed by using a binocular camera and a GPU, and a high-performance solving algorithm is constructed to obtain a high-quality grid map containing three-dimensional information. The system in the present invention is easy to construct, so the input data may be collected by using the binocular stereo camera; the program is simple and easy to implement. According to the present invention, the grid height is calculated by using spatial prior information and statistical knowledge, so that a three-dimensional result is more robust; and according to the present invention, the adaptive threshold of grids is solved by using spatial geometry, filtering and screening of the grids are completed, and thus the generalization ability and robustness of the algorithm are improved.

5 Claims, 5 Drawing Sheets

(56) References Cited

U.S. PATENT DOCUMENTS

| | | | | |
|---|---|---|---|---|
| 2016/0255327 A1* | 9/2016 | Cole | ............... | G09G 5/003 |
| | | | | 348/43 |
| 2017/0098309 A1* | 4/2017 | Michel | ............... | G06T 17/05 |
| 2017/0103568 A1* | 4/2017 | Satkin | ............... | H04N 13/239 |
| 2019/0335300 A1 | 10/2019 | Viton | | |
| 2019/0385360 A1* | 12/2019 | Yang | ............... | H04N 13/271 |

FOREIGN PATENT DOCUMENTS

| | | |
|---|---|---|
| CN | 108319655 A | 7/2018 |
| CN | 110297491 A | 10/2019 |
| EP | 3531069 A1 | 8/2019 |

\* cited by examiner

METHOD FOR CONSTRUCTING GRID MAP BY USING BINOCULAR STEREO CAMERA

TECHNICAL FIELD

The present invention belongs to the field of image processing and computer vision, and particularly relates to a method for constructing a grid map by using a binocular stereo camera. According to the present invention, disparity images are acquired by using a binocular camera, a grip map is constructed by using prior information of a three-dimensional space, and the space occupation and height information of objects are deduced by using statistics.

BACKGROUND

With the development of artificial intelligence in recent years, people pay more and more attention to mobile robots and autonomous vehicles, and one of the main problems to be solved is the construction of navigation maps. A grid map is the most common one of the navigation maps, but at present, a large number of grid map construction algorithms use laser sensors. However, laser sensors have some inevitable problems, such as high price, difficulty in popularization at present, low image resolution and difficulty in presenting scenario details. The present invention proposes a method for constructing a grip map by using a binocular stereo camera which is low in cost, universal and easy to use, and high in image resolution. However, there are few methods for constructing grip maps by using binocular stereo cameras in current applications, and maps constructed by most methods for constructing grip maps are two-dimensional maps which lack height information and cannot meet the requirements of unmanned aerial vehicles and other equipment with three-dimensional mobility. Different from probabilistic grid maps, the present invention pays more attention to the three-dimensional information of objects existing in each grid, so the grid map stores the three-dimensional information of objects, and the probability of existence of objects in grids in the grid map is understood as the number of times the grids are projected. In this way, screening is performed by means of the algorithm, grids with high projection number of times and high probability are kept, and grids with low projection number of times and low probability are eliminated. The present invention aims to construct a local obstacle avoidance grid map containing three-dimensional spatial information by using a binocular camera.

SUMMARY

To achieve the above object, the present invention provides a method for constructing a grid map by using a binocular stereo camera. As a representation for a space, a grid map represents current scenario information on a certain plane in the space. In order to illustrate the specific algorithm, there is the following example in the present invention: in space, a spatial rectangular coordinate system is created with the intersection of the left camera of the binocular camera and the vertical line of the ground as an origin O, the horizontal right as the positive direction of the X axis, the vertical upward as the positive direction of the Y axis and the horizontal forward as the positive direction of Z axis, this coordinate system being a world coordinate system. The grid map is created on an XOZ plane, and each grid in the grid map represents a small plane region on the plane. Each grid in the grid map has one and only one state which may be set as: unknown, occupied or empty.

The present invention adopts the following specific technical solution:

A method for constructing a grid map by using a binocular stereo camera, comprising the following steps:

1) Creation of a grid map:

1.1) Determining spatial information of the grid map: acquiring the maximum height, minimum height, maximum distance and field of view to be calculated from a configuration file; and determining the spatial information of the grid map, that is, the highest position, lowest position, farthest position, nearest position, rightmost position and leftmost position covered by the grid map;

1.2) Dividing grids: dividing the grid map into regular graphics; calculating the coordinates of all grid centers; and taking the state of all grids to be empty by default;

1.3) Determining a world coordinate system according to the actual placement position of the binocular camera;

2) Acquisition of original data: acquiring a scenario image and a disparity image by using the binocular stereo camera;

3) Generation of three-dimensional coordinate points: generating three-dimensional coordinate points by using the triangular relationship between the matching points in the scenario image and the disparity image and converting same to the world coordinate system, and only retaining the three-dimensional coordinate points located in the grid space determined in 1.1);

4) Projection onto plane:

4.1) Projecting the filtered three-dimensional coordinate points onto the plane where the grid map is located, and if the projected three-dimensional coordinate points are mapped within the range R of the grid centers, keeping and calculating the projection number of times, otherwise, eliminating and not calculating the projection number of times;

4.2) Calculating the number $N_i$ of points in each grid;

5) Height calculation and height filtering:

5.1) Letting the length of a statistical interval i be length, and the height represented by each statistical interval be $h_i$, ($h_i$=i×length), calculating the interval i=[y/length] in which the Y-axis coordinate y of all three-dimensional points projected into the grid is located, and calculating a frequency $C_i$. There are two conditions for selecting the maximum statistical interval $i_{max}$: one is that the frequency $C_i$ of the statistical interval is greater than a certain number of the frequency $C_{i-1}$ of the previous statistical interval, and the other is that the frequency $C_i$ is greater than N, the formula being:

$$i_{max} = \underset{i}{\mathrm{argmax}}\{C_i > N, C_i > \alpha C_{i-1}\} \qquad (1)$$

where $C_i$ represents the frequency of the $i^{th}$ statistical interval, $C_{i-1}$ represents the frequency of the $(i-1)^{th}$ statistical interval, α represents the first scale factor, and N represents the minimum frequency;

5.2) Letting $T_h$ be the minimum obstacle height according to the prior of the application scenario, and if the height $h_i$ of the grid is less than $T_h$, letting the state of the grid be empty, otherwise, continuing;

6) Grid threshold screening:

6.1) By using the disparity image and the grid map created in 1), calculating the threshold $T_i$ of each grid, the formulae being as follows:

$$a_r = \frac{img\_width \times grid\_size}{2 \times depth_r \times \tan(fov/2)} \quad (2)$$

$$b_i = \frac{a_r \times h_i}{grid\_size} \quad (3)$$

$$T_i = \beta_r \times a_r \times b_i \quad (4)$$

where formula (2) shows that when the depth measurement is accurate, $a_r$ pixels are used to represent the grid side length in the $r^{th}$ row, where img_width represents the disparity image width, grid_size represents the grid side length, $depth_r$ represents the grid depth in the $r^{th}$ row, and fov represents the size of the field of view; formula (3) shows that when the depth measurement is accurate, $b_i$ pixels are used to represent the grid height $h_i$ in the $r^{th}$ row, where $h_i$ represents the height in the grid i, which is calculated in step 5); $T_i$ represents the grid threshold, and $a_r \times b_i$ represents the number of pixels in a rectangular plane having a width of grid_size and a height of $h_i$ in the $r^{th}$ row when the depth measurement is accurate; considering the irregular shape and robustness, a second scale factor $\beta_r$ is added;

6.2) Comparing the number $N_i$ of the projected points in each grid with the grid threshold $T_i$; and if $N_i > \gamma T_i$, letting the state of the grid be occupied, otherwise, letting same be empty, $\gamma$ representing a third scale factor;

6.3) If the state of the grid is occupied, combining $X_i$ and $Z_i$ coordinates of the grid centers and the grid height $h_i$ as the highest points of the current grid;

7) Map scanning:

7.1) Setting the state of the grids in a region outside the field of view fov in the grid map as unknown;

7.2) Converting the optical center coordinate of the binocular camera to the world coordinate system and setting same as O'; connecting O' with the virtual highest points ($X_i$, $Z_i$, $h_i$) of the grid in an occupied state to form a straight line l, and projecting the straight line l onto the XOZ plane where the grid map is located, the projected line being l';

7.3) Searching the direction of the projected line l' away from the binocular camera, and if the projected line l' passes through the grid in an empty state, setting the state of the grid in an empty state as unknown; if the projected line l' passes through the grid in an occupied state, vertically projecting the grid centers ($X_i$, O, $Z_i$) onto the projected line l' to obtain projected points ($X_i'$, O, $Z_i'$), and if $\overline{Y}_i < l(X_i', Z_i')_y$, setting the state thereof as unknown; if the projected line l' passes through the grid in an occupied state and $h_i > l(X_i', Z_i')_y$, recalculating the straight line l and the projected line l' and continuing the above process; if the projected line l' passes through the grid in an occupied state and $\overline{Y}_i = l(X_i'', Z_i')_y$, continuing the search; and if the projected line l' reaches outside the grid space, ending the search, where $l(X_i', Z_i')_y$ represents that when $X = X_i'$ and $Z = Z_i'$, the Y-axis coordinate on the straight line l is taken;

8) Visualization: setting pixel resolutions corresponding to the grids, and visualizing and outputting the grid map in 7).

The present invention has the following beneficial effects:

The present invention designs a method for constructing a grid map by using a binocular stereo camera, which solves the height of each grid by using statistics and solves the adaptive threshold of the grid by using spatial geometry, constructs a reliable grid map, and has the following characteristics:

(1) The system is easy to construct, so input data may be collected by using the stereo binocular camera;

(2) The program is simple and easy to implement;

(3) By using spatial prior information to filter disparity and efficient algorithm to filter grids, the operating speed and accuracy of grid calculation are improved;

(4) The grid height is calculated by using statistics, having robustness; and (5) The adaptive threshold of grids is solved by using spatial geometry, and thus the generalization ability and robustness of the algorithm are improved.

DETAILED DESCRIPTION

The present invention proposes a method for constructing a grid map by using a binocular stereo camera. The specific embodiments of the present invention will be described in detail with reference to the technical solution and drawings.

Figure 1:
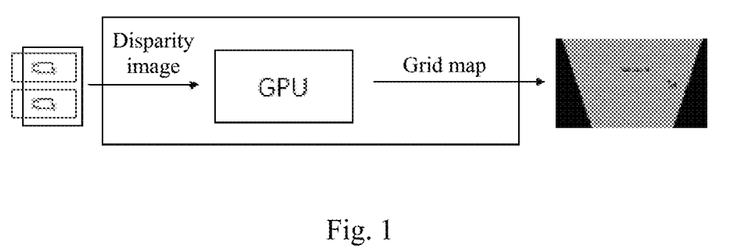
FIG. 1 shows an actual acquisition platform.

A binocular stereo camera is placed on a fixed platform, the image resolution of the experiment camera is 1280×720, and the field of view is 45.4°. The experimental platform is shown in FIG. 1. To ensure timeliness, a GPU is used to calculate a grid map. On this basis, a method for constructing a grid map is designed, the method comprising the following steps:

1) Creation of a grid map:

1.1) Acquiring the maximum height max_height, minimum height min height, maximum distance max_depth and field of view fov to be calculated from a configuration file, that is, determining the rightmost position as max_rigtht=tan(fov/2)×max_depth and the leftmost position as max_left=−tan(fov/2)×max_depth, thus determining the spatial information of the grid map.

1.2) Dividing the grid map into regular graphics, taking a square as an example (the same below), the side length is grid_size, the total number of rows of the grid is rows=max_depth/grid_size and the total number of columns is cols=(max_rigtht−max_left)/grid_size.

Calculating that the X coordinate of the grid center is (c-cols/2+0.5)×*grid_size, c being the column number where the grid is located, and the Z coordinate is (rows-r-0.5)×*grid_size, r being the row number where the grid is located; and setting the Y coordinate to 0.

1.3) Determining a world coordinate system according to the actual placement position of the binocular camera:

in space, a spatial rectangular coordinate system is created with the intersection of the left camera of the binocular camera and the vertical line of the ground as an origin O, the horizontal right as the positive direction of the X axis, the vertical upward as the positive direction of the Y axis and the horizontal forward as the positive direction of Z axis, this coordinate system being a world coordinate system.

Figure 2:
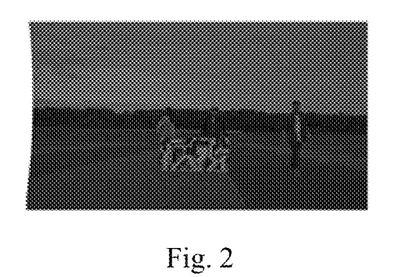
FIG. 2 shows a left image captured by the left camera.
Figure 3:
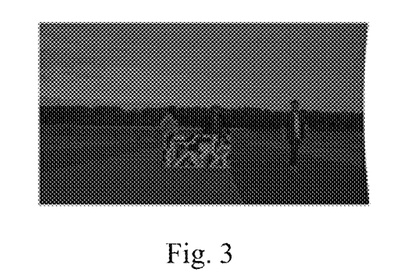
FIG. 3 shows a right image captured by the right came.
Figure 4:
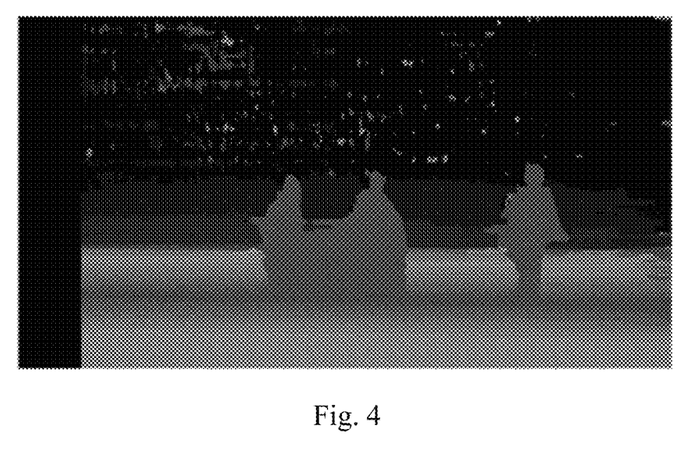
FIG. 4 shows a disparity image.
Figure 5:
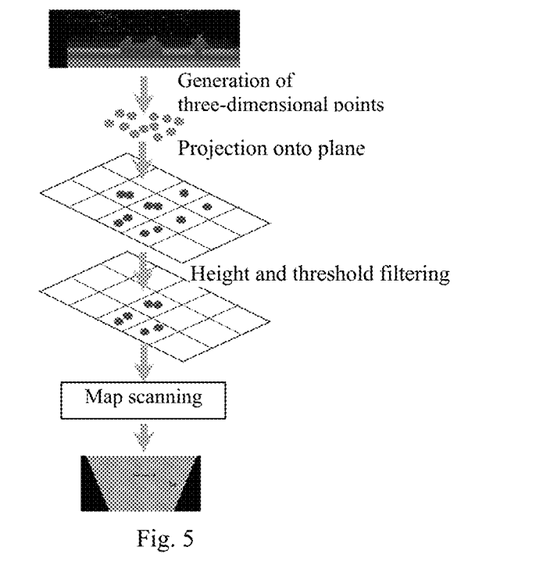
FIG. 5 is an overall flow chart of the algorithm.
Figure 7:
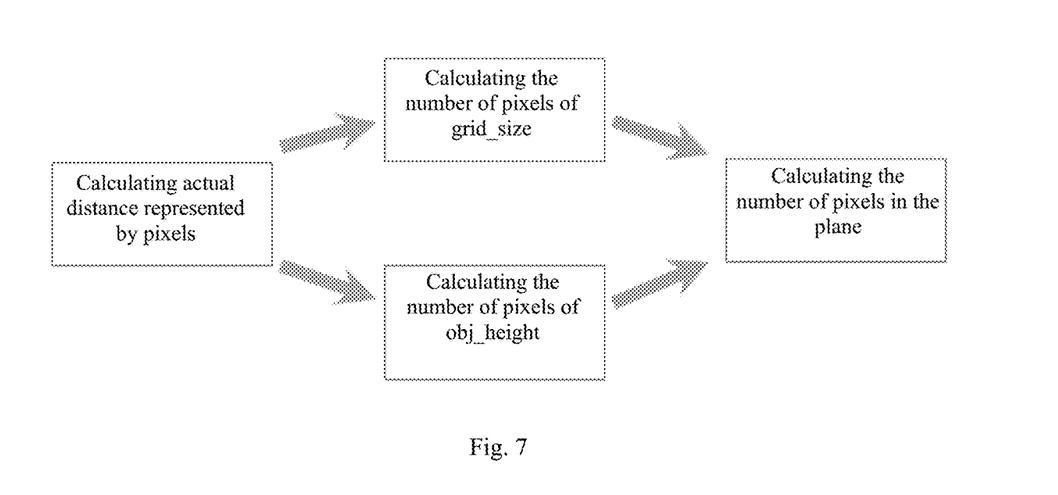
FIG. 7 is a schematic diagram of the grid threshold calculation method.
Figure 8:
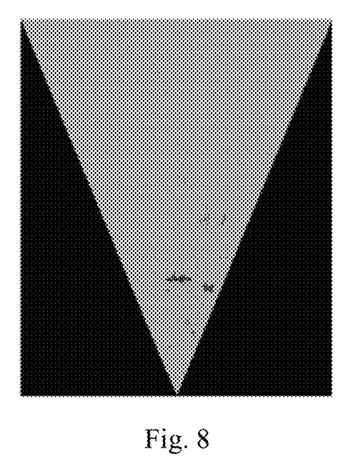
FIG. 8 shows a visualization result not filtered.
Figure 9:
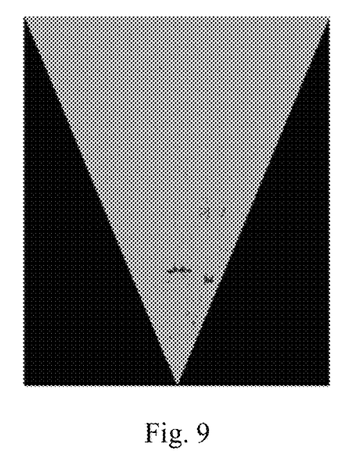
FIG. 9 shows a visualization result after adding height filtering of FIG. 8.
Figure 10:
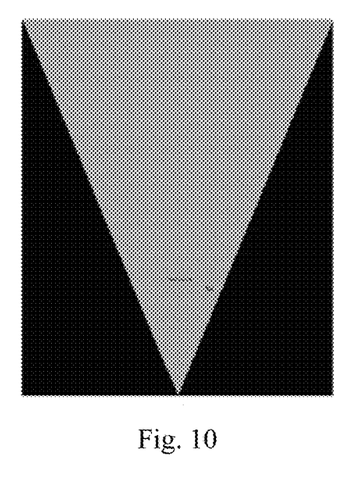
FIG. 10 shows a visualization result after adding threshold filtering of FIG. 9.
Figure 11:
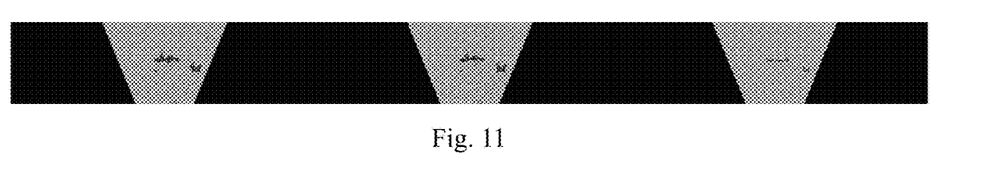
FIG. 11 is an enlarged detail view.

2) Acquisition of original data: acquiring a scenario image and a disparity image by using the binocular stereo camera, wherein the scenario image is as shown in FIG. 2 and FIG. 3, and the disparity image is as shown in FIG. 4;

as shown in FIG. 5, the following is the main flow of the algorithm, which is specifically described as follows:

3) Generation of three-dimensional coordinate points: generating three-dimensional coordinate points by using the triangular relationship between the matching points in the binocular image and the disparity image and converting same to the world coordinate system, and only retaining the three-dimensional coordinate points located in the grid space determined in 1.1);

4) Projection onto plane:

4.1) Projecting the filtered three-dimensional coordinate points (X, Y, Z) onto the plane where the grid map is located, wherein the projected points are (X, O, Z), the projection grid row number is r=rows−Z/grid_size−1, if X<0, the column number is c=X/grid_size−max_left−1, otherwise, c=X/grid_size−max_left. The grid center coordinates may be found from step 1). Calculating the distance d between the projected points and the grid centers, if d<R, keeping the projected points, otherwise, eliminating same, where R takes three-quarters of the radius of the inscribed circle of the grid;

4.2) Calculating the number $N_i$ of points in each grid;

5) Height calculation and height filtering:

5.1) Letting the length of a statistical interval i be length, and the height represented by each statistical interval be $h_i$, ($h_i$=i×length), calculating the interval i=[y/length] in which the Y-axis coordinate y of all three-dimensional points projected into the grid is located, and calculating a frequency $C_i$. There are two conditions for selecting the maximum statistical interval $i_{max}$: one is that the frequency $C_i$ of the statistical interval is greater than a certain number of the frequency $C_{i-1}$ of the previous statistical interval, and the other is that the frequency $C_i$ is greater than N, the formula being:

$$i_{max} = \underset{i}{\mathrm{argmax}}\{C_i > N, C_i > \alpha C_{i-1}\} \quad (1)$$

where $C_i$ represents the frequency of the $i^{th}$ statistical interval, $C_{i-1}$ represents the frequency of the $(i-1)^{th}$ statistical interval, a represents the first scale factor, and N represents the minimum frequency;

5.3) Letting $T_h$ be the minimum obstacle height according to the prior of the application scenario, and if the height $h_i$ of the grid is less than $T_h$, letting the state of the grid be empty, otherwise, continuing;

6) Grid threshold screening, as shown in FIG. 7:

6.1) Calculating the threshold $T_i$ of each grid, the formulae being as follows:

$$a_r = \frac{\mathrm{img\_width} \times \mathrm{grid\_size}}{2 \times depth_r \times \tan(fov/2)} \quad (2)$$

$$b_i = \frac{a_r \times h_i}{\mathrm{grid\_size}} \quad (3)$$

$$T_i = \beta_r \times a_r \times b_i \quad (4)$$

where formula (2) shows that when the depth measurement is accurate, $a_r$ pixels are used to represent the grid side length in the $r^{th}$ row, where img_width represents the disparity image width, grid_size represents the grid side length, $depth_r$ represents the grid depth in the $r^{th}$ row, and fov represents the size of the field of view; formula (3) shows that when the depth measurement is accurate, $b_i$ pixels are used to represent the grid height $h_i$ in the $r^{th}$ row, where $h_i$ represents the height in the grid i, which is calculated in step 5); $T_i$ represents the grid threshold, and $a_r \times b_i$ represents the number of pixels in a rectangular plane having a width of grid_size and a height of $h_i$ in the $r^{th}$ row when the depth measurement is accurate; considering the irregular shape and robustness, a the second scale factor $\beta_r$ is added;

6.2) Comparing the number $N_i$ of the projected points in each grid with $T_i$, if $N_i > \gamma T_i$, letting the state of the grid be occupied, otherwise, letting same be empty, γ representing a third scale factor;

6.3) If the state of the grid is occupied, combining $X_i$ and $Z_i$ coordinates of the grid centers and the grid height $\overline{Y}_i$ as the highest points $(X_i, Z_i, h_i)$ of the current grid;

7) Map scanning:

7.1) Setting the state of the grid in a region outside the field of view fov in the grid map as unknown, the row number r of the grid in the region and the column number c having the following relationship:

c<r×tan(fov/2)‖r× tan(fov/2)≥grid_width−c 7.2) Converting the optical center coordinate of the binocular camera to the world coordinate system and setting same as O'; connecting O' with the virtual highest points $(X_i, Z_i, h_i)$ of the grid in an occupied state to form a straight line l, and projecting the straight line l onto the XOZ plane where the grid map is located, the projected line being l'.

7.3) Searching the direction of the projected line l' away from the binocular camera, and if the projected line l' passes through the grid in an empty state, setting the state of the grid in an empty state as unknown; if the projected line l' passes through the grid in an occupied state, vertically projecting the grid centers $(X_i, O, Z_i)$ onto the projected line l' to obtain projected points $(X_i', O, Z_i')$, and if $\overline{Y}_i < l(X_i', Z_i')_y$, setting the state thereof as unknown; if the projected line l' passes through the grid in an occupied state and $h_i > l(X_i', Z_i')_y$, recalculating the straight line l and the projected line l' and continuing the above process; if the projected line l' passes through the grid in an occupied state and $\overline{Y}_i = l(X_i', Z_i')_y$, continuing the search; and if the projected line l' reaches outside the grid space, ending the search, where $l(X_i', Z_i')_y$ represents that when $X=X_i'$ and $Z=Z_i'$, the Y-axis coordinate on the straight line l is taken;

8) Visualization: setting pixel resolutions corresponding to the grids, visualizing and outputting the grid map. In FIGS. 8-11, the resolutions are set as pixel blocks of 4×4 for one grid.

Figure 6:
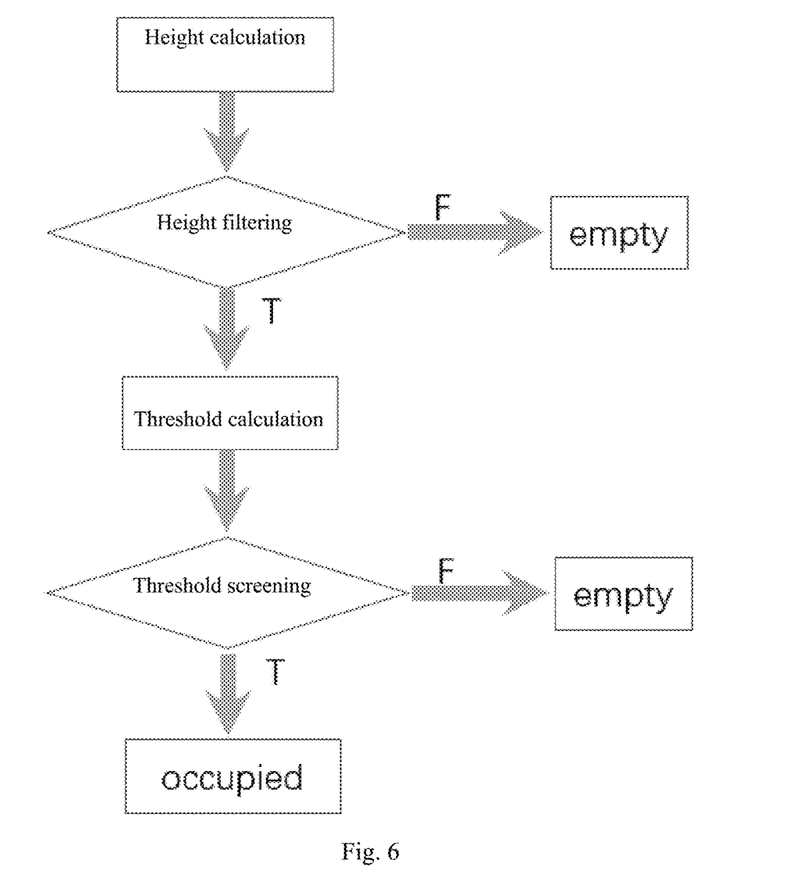
FIG. 6 is a flow chart showing filtering and screening.

This embodiment describes in detail the method for constructing a grid map by using a binocular stereo camera. FIGS. 1-4 show system equipment and input, FIGS. 5-7 show description of the algorithm flow, and FIGS. 8-11 show output.

The invention claimed is:

1. A method for constructing a grid map by using a binocular stereo camera, comprising the following steps:

1) creation of a grid map:

1.1) determining spatial information of the grid map: acquiring a maximum height, minimum height, maximum distance and field of view to be calculated from a configuration file; and determining spatial information of the grid map, the spatial information of the grid map including a highest position, lowest position, farthest position, nearest position, rightmost position and leftmost position covered by the grid map;

1.2) dividing grids: dividing the grid map into regular graphics; calculating coordinates of all grid centers; and taking a state of all grids to be empty by default;
1.3) determining a world coordinate system according to the an actual placement position of the binocular stereo camera;
2) acquisition of original data: acquiring a scenario image and a disparity image by using the binocular stereo camera;
3) generation of three-dimensional coordinate points: generating three-dimensional coordinate points by using a triangular relationship between matching points in the scenario image and the disparity image and converting the three-dimensional coordinate points to the world coordinate system, and only retaining the three-dimensional coordinate points located in the grid space determined in 1.1);
4) projection onto plane:
4.1) projecting the retained three-dimensional coordinate points onto a plane where the grid map is located, and if the projected three-dimensional coordinate points are mapped within a range R of the grid centers, keeping and calculating a projection number of times, otherwise, eliminating and not calculating a projection number of times;
4.2) calculating a number $N_i$ of points in each grid;
5) height calculation and height filtering:
5.1) letting a length of a statistical interval i be length, and a height represented by each statistical interval be $h_i$, $h_i$=i×length, calculating an interval i=[y/length] in which a Y-axis coordinate y of all three-dimensional points projected into the grid is located, and calculating a frequency $C_i$;
5.2) letting $T_h$ be the minimum obstacle height according to the prior of the application scenario, and if the height h, of the grid is less than $T_h$, letting the state of the grid be empty, otherwise, continuing;
6) grid threshold screening:
6.1) by using the disparity image and the grid map created in 1), calculating a threshold $T_i$, of each grid, the formulae being as follows:

$$a_r = \frac{img\_width * grid\_size}{2 * depth_r * \tan\left(\frac{fov}{2}\right)} \quad (1)$$

$$b_i = \frac{a_r * h_i}{grid\_size} \quad (2)$$

$$T_i = \beta_r * a_r * b_i \quad (3)$$

where formula (1) shows that when a depth measurement is accurate, ar pixels are used to represent a grid side length in an $r^{th}$ row, where img_width represents a disparity image width, grid_size represents a grid side length, depthr represents a grid depth in the $r^{th}$ row and fov represents a size of the field of view; formula (2) shows that when the depth measurement is accurate, $b_i$ pixels are used to represent a grid height $h_i$ in the $r^{th}$ row, where $h_i$ represents a height in the grid i, which is calculated in step 5); $T_i$ represents a grid threshold, and $a_r \times b_i$ represents a number of pixels in a rectangular plane having a width of grid_size and a height of $h_i$ in the $r^{th}$ row when the depth measurement is accurate; considering irregular shape and robustness, a first scale factor $\beta_r$ is added;

6.2) comparing a number $N_i$ of the projected points in each grid with the grid threshold $T_i$; and if $N_i > \gamma T_i$, letting the state of the grid be occupied, otherwise, letting the state of the grid be empty, γ representing a second scale factor;
6.3) if the state of the grid is occupied, combining $X_i$ and $Z_i$ coordinates of the grid centers and the grid height $h_i$ as the highest points of the current grid; and
7) map scanning.

2. The method for constructing a grid map by using a binocular stereo camera according to claim 1, wherein in the step 4.1), R takes three-quarters of the radius of an inscribed circle of the grid.

3. The method for constructing a grid map by using a binocular stereo camera according to claim 1, wherein in the step 5.1), there are two conditions for selecting a maximum statistical interval $i_{max}$: one is that frequency $C_i$ of the a statistical interval is greater than a certain number of the frequency $C_{i-1}$ of a previous statistical interval, and the other is that frequency $C_i$, is greater than N, the formula being:

$$i_{max} = \underset{i}{\operatorname{argmax}}\{C_i > N, C_i > \alpha C_{i-1}\} \quad (4)$$

where $C_i$, represents the frequency of the $i^{th}$ statistical interval, $C_{i-1}$ represents the frequency of the $(i-1)^{th}$ statistical interval, α represents a third scale factor, and N represents a minimum frequency.

4. The method for constructing a grid map by using a binocular stereo camera according to claim 1, wherein the step 7)-map scanning comprises:
7.1) setting the state of the grid in a region outside the field of view fov in the grid map as unknown;
7.2) converting an optical center coordinate of the binocular camera to the world coordinate system and setting the converted optical center coordinate as O'; connecting O' with the virtual highest points $(X_i, Z_i, h_i)$ of the grid in an occupied state to form a straight line l, and projecting the straight line l onto an XOZ plane where the grid map is located, the projected line being l';
7.3) searching a direction of the projected line l' away from the binocular stereo camera, and if the projected line l' passes through the grid in an empty state, setting the state of the grid in an empty state as unknown; if the projected line passes through the grid in an occupied state, vertically projecting the grid centers $(X_i, O, Z_i)$ onto the projected line l' to obtain projected points $(X_i', O, Z_i')$, and if $\overline{Y_i} < l(X_i', Z_i')_y$, setting the state thereof as unknown; if the projected line l' passes through the grid in an occupied state and $h_i > l(X_i', Z_i')_y$, recalculating the straight line l and the projected line l' and continuing the above process; if the projected line l' passes through the grid in an occupied state and $\overline{Y_i} = l(X_i', Z_i')_y$, continuing the search; and if the projected line l' reaches outside the grid space, ending the search, where $l(X_i', Z_i')_y$ represents that when $X = X_i'$ and $Z = Z_i'$, the Y-axis coordinate on the straight line l is taken.

5. The method for constructing a grid map by using a binocular stereo camera according to claim 1, further comprising step 8)-visualization: setting pixel resolutions corresponding to the grids, and visualizing and outputting the grid map in 7).

* * * * *